(12) United States Patent
Lesso

(10) Patent No.: US 11,024,317 B2
(45) Date of Patent: Jun. 1, 2021

(54) MICROPHONE AUTHENTICATION

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 143 days.

(21) Appl. No.: 16/144,184

(22) Filed: Sep. 27, 2018

(65) Prior Publication Data

US 2019/0103115 A1 Apr. 4, 2019

Related U.S. Application Data

(60) Provisional application No. 62/565,726, filed on Sep. 29, 2017.

(30) Foreign Application Priority Data

Oct. 27, 2017 (GB) ...................................... 1717726

(51) Int. Cl.
  *G10L 17/02* (2013.01)
  *G06F 21/32* (2013.01)
  (Continued)

(52) U.S. Cl.
  CPC .............. *G10L 17/02* (2013.01); *G06F 3/167* (2013.01); *G06F 21/32* (2013.01); *G06F 21/44* (2013.01);
  (Continued)

(58) Field of Classification Search
  USPC .................. 704/246, 247, 251, 252
  See application file for complete search history.

(56) References Cited

U.S. PATENT DOCUMENTS 5,471,528 A 11/1995 Reesor
5,511,130 A 4/1996 Bartlett et al.
(Continued)

FOREIGN PATENT DOCUMENTS

CN 1213262 A 4/1999
CN 101690255 A 3/2010
(Continued)

OTHER PUBLICATIONS

Combined Search and Examination Report under Sections 17 and 18(3), UKIPO, Application No. GB1717726.2, dated Apr. 24, 2018.
(Continued)

*Primary Examiner* — Leonard Saint Cyr
(74) *Attorney, Agent, or Firm* — Jackson Walker L.L.P.

(57) ABSTRACT

This application relates to microphone authentication apparatus for verifying whether or not an audio signal originated at a microphone (101, 102). The microphone authentication apparatus (300) has a comparison block (301) configured to receive a first signal (A*) indicative of one or more spectral parameters of at least part of an audio signal to be verified, and compare the one or more spectral parameters to one or more predetermined characteristic microphone parameters relating to a characteristic resonance associated with an acoustic port of a microphone. The first signal (A*) may be an audio signal (A) and the microphone authentication apparatus may have a feature extract module (303) for determining the spectral parameters. Based on the comparison determination block (304) may whether the audio signal originated from a microphone and may send a verification signal ($V_{MIC}$) to a voice biometric module 111.

20 Claims, 6 Drawing Sheets

(51) Int. Cl.
*G06F 3/16* (2006.01)
*G10L 25/51* (2013.01)
*G06F 21/83* (2013.01)
*G06F 21/44* (2013.01)
*G10L 25/03* (2013.01)
*G10L 25/18* (2013.01)

(52) U.S. Cl.
CPC .............. *G06F 21/83* (2013.01); *G10L 25/51* (2013.01); *G10L 25/03* (2013.01); *G10L 25/18* (2013.01)

(56) References Cited

U.S. PATENT DOCUMENTS

| | | | |
|---|---|---|---|
| 9,860,635 B2* | 1/2018 | Fukuda | H04N 5/2252 |
| 10,566,011 B2* | 2/2020 | Park | G10L 17/22 |
| 10,674,253 B2 | 6/2020 | Lesso et al. | |
| 2002/0028021 A1* | 3/2002 | Foote | G06K 9/00758 382/224 |
| 2004/0221237 A1* | 11/2004 | Foote | G06F 16/7328 715/700 |
| 2007/0286441 A1 | 12/2007 | Harsch et al. | |
| 2008/0174665 A1* | 7/2008 | Enstad | H04N 7/15 348/211.12 |
| 2008/0247587 A1 | 10/2008 | Sato | |
| 2008/0310663 A1 | 12/2008 | Shirasaka et al. | |
| 2009/0299742 A1 | 12/2009 | Toman et al. | |
| 2011/0095900 A1 | 4/2011 | Smith et al. | |
| 2012/0250900 A1 | 10/2012 | Sakai | |
| 2012/0308047 A1 | 12/2012 | Muza | |
| 2014/0270206 A1 | 9/2014 | Port | |
| 2015/0214912 A1 | 7/2015 | Khenkin | |
| 2015/0289073 A1 | 10/2015 | Salvia et al. | |
| 2015/0304786 A1 | 10/2015 | Partio et al. | |
| 2016/0127845 A1 | 5/2016 | Cagdaser et al. | |
| 2017/0034623 A1 | 2/2017 | Christoph et al. | |
| 2017/0111751 A1 | 4/2017 | Miehl et al. | |
| 2017/0227499 A1 | 8/2017 | Miller et al. | |
| 2017/0275986 A1 | 9/2017 | Nunes et al. | |
| 2018/0130485 A1* | 5/2018 | Park | G10L 25/21 |
| 2018/0188347 A1* | 7/2018 | Gao | G01S 3/86 |
| 2018/0288526 A1 | 10/2018 | Zou | |

FOREIGN PATENT DOCUMENTS

| | | |
|---|---|---|
| CN | 102075840 A | 5/2011 |
| CN | 102740190 A | 10/2012 |
| CN | 103348699 A | 10/2013 |
| CN | 104113809 A | 10/2014 |
| CN | 105246013 A | 1/2016 |
| CN | 105847592 A | 8/2016 |
| CN | 106031192 A | 10/2016 |
| EP | 2346270 A2 | 7/2011 |
| EP | 2768239 A1 | 8/2014 |
| GB | 2497429 A | 6/2013 |
| GB | 2530565 A | 3/2016 |
| JP | 2013223057 A | 10/2013 |
| WO | 8402187 A1 | 6/1984 |
| WO | 2013083947 A1 | 6/2013 |
| WO | 2016003299 A1 | 1/2016 |
| WO | 2016069812 A1 | 5/2016 |

OTHER PUBLICATIONS

International Search Report and Written Opinion of the International Searching Authority, International Application No.
International Search Report and Written Opinion of the International Searching Authority, International Patent Application No. PCT/GB2018/050752, dated May 16, 2018.
International Search Report and Written Opinion of the International Searching Authority, International Patent Application No. PCT/GB2018/050754, dated May 30, 2018.
Yu, Ganghua et al., "Effect of internal resistance of a Helmholtz resonator on acoustic energy reduction in enclosures", The Journal of the Acoustical Society of America, vol. 124, No. 6, Dec. 1, 1008, pp. 3534-3543, NY NY.
International Search Report and Written Opinion of the International Searching Authority, International Patent Application No. PCT/GB2018/050755, dated Jun. 14, 2018.
Combined Search and Examination Report under Sections 17 and 18(3), UKIPO, Application No. GB1706708.3, dated Jun. 15, 2017.
Combined Search and Examination Report under Sections 17 and 18(3), UKIPO, Application No. GB1706707.5, dated Jun. 16, 2017.
Combined Search and Examination Report under Sections 17 and 18(3), UKIPO, Application No. GB1706704.2, dated Jul. 19, 2017.
Examination Report under Section 18(3), UKIPO, Application No. GB1706708.3, dated Jul. 30, 2019.
Examination Report under Section 18(3), UKIPO, Application No. GB1706704.2, dated Jul. 30, 2019.
Examination Report, National Intellectual Property Administration, People's Republic of China, Application No. 201880020505.0, dated Aug. 27, 2020.
Examination Report, National Intellectual Property Administration, People's Republic of China, Application No. 201880020483.8, dated Nov. 4, 2020.
Examination Report, National Intellectual Property Administration, People's Republic of China, Application No. 201880020468.3, dated Nov. 4, 2020.

* cited by examiner

MICROPHONE AUTHENTICATION

FIELD OF DISCLOSURE

The field of representative embodiments of this disclosure relates to methods, apparatus and/or implementations concerning or relating to verification or authentication of audio data and especially to transfer of audio data between a microphone and a component for processing the audio data with verification.

BACKGROUND

It is increasingly being proposed to provide electronic devices with voice user interfaces to allow a user to interact with a system using their voice.

One advantage of this interface, for example in devices such as smartphones, tablet computers and the like, is that it may allow the user to operate at least some aspects of the device in a hands-free manner. Speech recognition techniques, i.e. techniques to extract the words spoken from the voice audio signal, may, for example, be used to detect that a particular trigger phrase has been spoken, to set the device to expect a spoken command, and to recognize a command when spoken and to perform operations in response. For example, if the spoken command asks for publicly available information, then the interface may cause a query to be submitted to an internet search engine in order to be able to supply that information to the user.

In some cases, some level of authentication may be desirable to verify the identity of the user before acting on a command, whether spoken or not, for example if the command relates to personal information, or requests some financial transaction.

It is expected that biometric based authentication will replace passwords, particularly on mobile platforms, as long passwords are difficult to remember, and difficult to type on such devices. Voice based biometric authentication may be one convenient authentication technique, especially where the device has a voice control interface as it allows a user to maintain a generally hands-free mode of user interaction.

The voice user interface may thus comprise some form of biometric speaker recognition, i.e. some analysis of the voice audio input signal to extract characteristics of that signal distinctive to one of one or more users. Speaker recognition may allow the identity of the user to be verified with a high level of confidence with more security than passwords and more conveniently than other biometric verification methods, such as fingerprint or iris patterns. Speaker recognition may thus form at least part of an authentication system for verifying the identity of a user. Multiple different types of authentication (e.g. passwords, fingerprint/iris/voice recognition, etc.) may be combined in order to increase the security of a particular operation.

While the use of biometrics in general increases the security of a particular operation, by ensuring the person requesting that the operation be carried out is a registered user of that device, biometric solutions are not invulnerable to attacks from third parties. For example, a fingerprint of a particular user may be stolen (e.g. "lifted" from an object the user has touched) by a third party intent on using that fingerprint to access the user's device. A user's voice may be recorded by a third party and played back to the device in order to bypass voice biometric security. A picture of the user's iris may be acquired and used to bypass iris recognition software.

All of these techniques require significant effort on the part of the third party attempting to gain access to the user's device. Further, even if successful, the techniques allow that third party access to just a single device at a time. A more modern technique for bypassing biometric security systems, requiring fewer resources and scalable to multiple devices at a time, may involve the surreptitious installation of malware on the user's device. For example, such malware may be able to bypass or otherwise prevent security processes from functioning effectively, and thus allow the third-party attacker access to the devices on which it is installed.

SUMMARY

Embodiments of the present disclosure relate to methods and apparatus for securing voice based biometric authentication systems by allowing verification of a source of received audio data.

According to some embodiments there is provided a microphone authentication apparatus comprising:
 a comparison block configured to: receive a first signal indicative of one or more spectral parameters of at least part of an audio signal to be verified, and compare said one or more spectral parameters of the first signal to one or more predetermined characteristic microphone parameters relating to a characteristic resonance associated with an acoustic port of a microphone; and
 a determination block configured to determine based on the comparison whether the audio signal originated from a microphone.

In some embodiments the one or more predetermined characteristic microphone parameters may comprise a peak frequency or range of peak frequencies of the characteristic resonance and/or the one or more predetermined characteristic microphone parameters may comprise a quality factor or a range of values of quality factor for the characteristic resonance. In some embodiments the one or more predetermined characteristic microphone parameters may be parameters of, or derived from, a model of the characteristic resonance. In some instances the one or more predetermined characteristic microphone parameters may be parameters of a function, such as a parabolic curve, describing the characteristic resonance.

The one or more predetermined characteristic microphone parameters may comprises at least one set of generic microphone parameters for one or more generic microphones. In which case the determination block may be configured to determine whether the audio signal originated from any microphone based on a comparison of the first signal with said at least one set of generic microphone parameters. Additionally or alternatively the one or more predetermined characteristic microphone parameters may comprise at least one set of specific microphone parameters relating to a specific microphone. In which case the determination block may be configured to determine whether the audio signal originated from the specific microphone based on a comparison of the first signal with respective one set of specific microphone parameters.

The determination block may be configured to output a microphone verification signal indicating whether or not the audio signal is determined to have originated from the microphone. In some implementations the determination block may be configured to output the microphone verification signal to a voice authentication module. In some implementations the microphone authentication apparatus may comprise a certification module for signing the microphone verification signal such that it can be verified that the microphone verification signal is genuine.

The first signal may comprise at least part of the audio signal to be verified. In which case a feature extract module may be configured to determine at least one spectral parameter of any resonance component within a signal band of interest of the first signal.

The feature extract module may be configured to: identify any resonance component within a signal band of interest of the first signal; apply curve fitting to any such identified resonance component to determine a fitted curve function; and determine at least one spectral parameter from the fitted curve function. The one or more spectral parameters may be parameters defining said fitted curve. The at least one spectral parameter may comprise a resonance peak frequency and/or a resonance peak quality factor.

The microphone authentication apparatus may comprise a processing module configured to receive a version of the audio signal to be verified and to process the audio signal to provide the first signal.

In some implementations the first signal may however comprise a data signal of values of said one or more spectral parameters of the audio signal.

The microphone authentication apparatus may comprise an analogue to digital converter configured to receive the audio signal to be verified and output a digital version of the audio signal.

Alternatively in some implementations the microphone authentication apparatus may be configured to receive the audio signal to be verified as a digital audio signal from a digital microphone. In some instances the digital audio signal may comprise a first signal part that corresponds to signal components that have been down-converted from a first frequency band to a down-converted frequency band, wherein the first frequency band comprises a frequency band of interest for the characteristic resonance. The microphone authentication apparatus may be configured to compensate for any down-conversion of the signal components of the first signal part. The digital audio signal may further comprise a second signal part that corresponds to signal components from a second frequency band, wherein the second frequency band comprises a frequency band of interest for voice audio. The microphone authentication apparatus may be configured to use the first signal part as the basis for the first signal supplied to the comparison module and the second signal part may be routed to a voice authentication module.

The microphone authentication apparatus may be implemented as at least part of a first integrated circuit. In some implementations the first integrated circuit may further comprise a voice authentication module configured to receive the audio signal and determine whether the audio signal corresponds to the voice of a registered user. In some implementations the first integrated circuit may be a codec or digital signal processing circuit.

Aspects also relate to a voice authentication apparatus comprising: a microphone authentication apparatus as described in any of the variants above; and a voice authentication module configured to receive the audio signal and determine whether the audio signal corresponds to the voice of a registered user. The voice authentication apparatus may be configured so as to not generate a positive verification result in the event that microphone authentication apparatus does not verify that the audio signal originate at a microphone.

Aspects also relate to a device comprising: a microphone authentication apparatus as described in any of the variants or a voice authentication apparatus as described. The device may comprise at least one on-board microphone and be operable to supply an audio signal from the at least one on-board microphone to the microphone authentication apparatus. The device may additionally or alternatively comprise an audio interface for receiving audio signals from a microphone of an accessory apparatus, wherein the device is operable to supply an audio signal from the audio interface to the microphone authentication apparatus. The device may be at least one of: a portable device; a battery powered device; a communication device; a mobile or cellular telephone or smartphone; a computing device; a laptop, notebook or tablet computing device; a wearable device; a smartwatch; a voice controlled or activated device; a media player; a gaming device; a domestic device or appliance.

Aspects also relate to a method of authenticating whether an audio signal was generated by a microphone, the method comprising: receiving a first signal indicative of one or more spectral parameters of the audio signal, comparing the one or more spectral parameters of the first signal to characteristic microphone parameters relating to a characteristic resonance associated with an acoustic port of the microphone; and determining based on the comparison whether the audio signal originated at the microphone.

In another aspect there is provided a device comprising processor circuitry and a memory, the memory containing instructions executable by said processor circuitry and which instructions when executed by said processor circuitry cause the processor circuitry to implement a method described above.

In another aspect there is an apparatus for verifying whether an audio signal originated at a microphone comprising: an authentication module configured to analyse one or more parameters of at least part of the audio signal to determine whether the audio signal comprises a signal component corresponding to a characteristic resonance of an acoustic system associated with the microphone.

In a further aspect there is an apparatus for verifying whether an audio signal originated at a microphone comprising: an authentication module configured to determine whether the audio signal comprises a signal component corresponding to a known Helmholtz resonance associated with the microphone.

In a further aspect there is a microphone authentication apparatus for determining whether an audio signal originated from a microphone, comprising: a comparison block configured to compare at least one acoustic characteristic of the audio signal to at least one distinguishing acoustic characteristic associated with the microphone; and a determination block configured to determine based on the comparison whether the first signal is representative of the at least one distinguishing acoustic characteristic so as to determine whether the audio signal originated from the microphone.

The at least one distinguishing acoustic characteristic may comprise at least one parameter of a frequency profile of a characteristic resonance of an acoustic port associated with the microphone.

In a further aspect there is a microphone authentication apparatus comprising: a comparison block configured to: receive a first signal indicative of at least part of an audio signal to be verified, and compare the first signal to microphone data relating to a characteristic resonance associated with an acoustic port of a microphone; and a determination block configured to determine based on the comparison whether the audio signal originated from a microphone.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 2a illustrates one example of a packaged MEMS microphone device having an acoustic port and FIG. 2b illustrates an example of a microphone signal from a packaged microphone having an acoustic port, for example for a microphone package such as shown in FIG. 2a;

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the present disclosure relate to methods and apparatus for verifying an audio signal, in particular for verifying a source of audio data. In particular, the present embodiments relate to verifying or authenticating that a particular audio signal originated at a microphone. In other words, embodiments relate to verifying or authenticating that a particular audio signal was generated by a microphone and corresponds to pressure waves acting on the microphone transducer. The microphone authentication apparatus may, for example, determine if an expected characteristic acoustic resonance for the microphone is present in the audio signal. If not, this is suggestive that the audio signal did not originate at the microphone, and therefore that the signal may be the result of a third party attack. The expected characteristic acoustic resonance may be a resonance that arises due to the acoustic port of the microphone, e.g. a Helmholtz resonance. The absence of such a characteristic acoustic resonance may indicate that the audio signal was not produced by the microphone, but falsely injected into a downstream signal path for audio.

Figure 1:
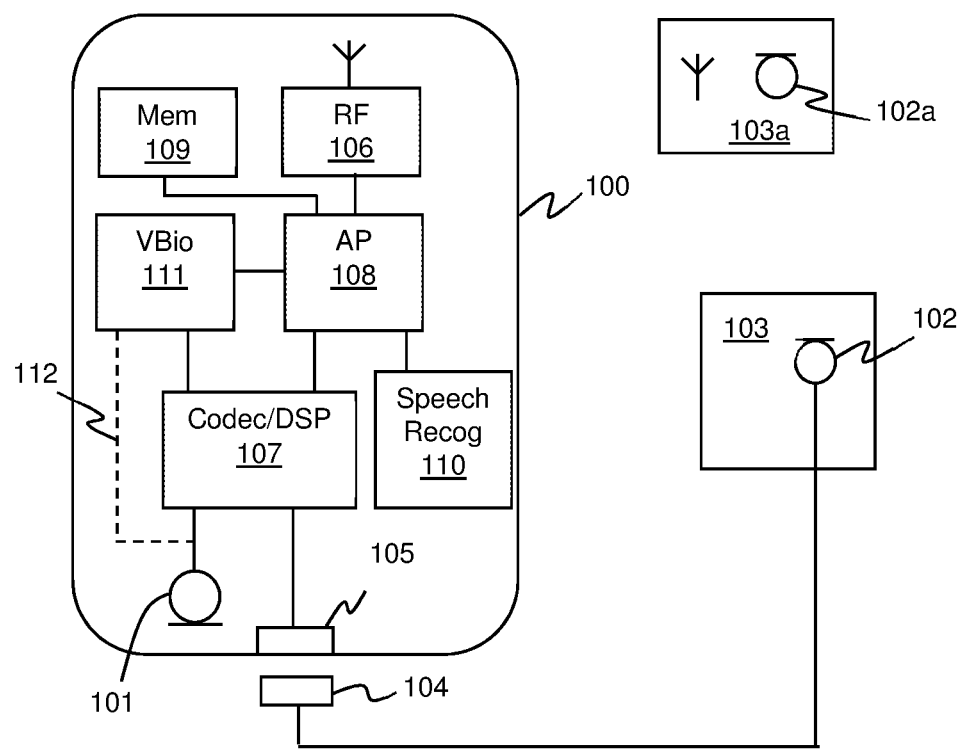
FIG. 1 illustrates an electronic device having a voice authentication module.

FIG. 1 illustrates one example of an electronic device 100, such as a mobile telephone or tablet computer for example. The electronic device 100 may comprise at least one microphone 101 for providing audio signals corresponding to detected sounds. A microphone 101 of the electronic device 100 may provide an analogue microphone audio signal but in some embodiments the microphone 101 may be a digital microphone that outputs a digital microphone audio signal.

Additionally or alternatively the device 100 may be operable, in use, to receive audio signals from at least one external microphone 102 of an accessory apparatus. An accessory apparatus 103 may, in some instances, be removably physically connected to the electronic device 100 for audio data transfer, for instance by a connector 104 of the accessory apparatus making a mating connection with a suitable connector 105 of the electronic device. Audio data received from the accessory apparatus 103 may be analogue or may, in some instances, comprise digital audio data.

In some instances, an accessory apparatus 103a may be configured for local wireless transfer of audio data from a microphone 102a of the accessory apparatus 103a to the electronic device 100, for instance via a wireless module 106 of the electronic device 100. Such wireless transfer could be via any suitable wireless protocol such as WiFi or Bluetooth™ for example.

Audio data from an on-board microphone 101 of the electronic device 100 and/or audio data from a microphone 102/102a of the accessory apparatus 103/103a may be processed in a variety of different ways depending on the operating mode or use case of the electronic device 100 at the time. Conveniently at least some processing is applied in the digital domain and thus, if necessary, the received microphone data may be converted to digital microphone data. The digital microphone data may be processed by audio processing circuitry 107 which may, for instance comprise an audio codec and/or a digital signal processor (DSP) for performing one or more audio processing functions, for instance to apply gain and/or filtering to the signals, for example for noise reduction.

A control processor 108 of the electronic device, often referred to as an applications processor (AP), may control at least some aspects of operation of the electronic device and may determine any further processing and/or routing of the received audio data. For instance, for telephone communications the received audio data may be forwarded to the wireless module 106 for broadcast. For audio or video recording the data may be forwarded to a memory 109 for storage. For voice control of the electronic device 100 the audio data may be forwarded to a speech recognition module 110 to distinguish voice command keywords.

The device 100 may also comprise a voice authentication module 111 for analysing audio data received from microphone 101, 102 and/or 102a and determining whether the audio data corresponds to the voice of a registered user, i.e. for performing speaker recognition.

The voice authentication module 111 receives input audio data, e.g. from the microphone 101, and compares characteristics of the received audio data with user-specific reference templates specific to a respective pre-registered authorized user (and maybe, for comparison, also with reference templates representative of a general population). Voice/speaker recognition techniques and algorithms are well known to those skilled in the art and the present disclosure is not limited to any particular voice recognition technique or algorithm.

The voice authentication module 111 may be activated according to a control input conveying a request for voice biometric authentication, for example from the AP 108. For example, a particular use case running on the AP 108 may require authentication to wake the device 100, or to authorize some command, e.g. a financial transaction. If the received audio data corresponds to an authorized user, the voice authentication module 111 may indicate this positive authentication result, for example by a signal BioOK which is sent to the AP 108. The AP 108 (or a remote server that has requested the authentication) may then act on the signal as appropriate, for example, by authorizing some activity that required the authentication, e.g. a financial transaction. If the authentication result was negative, the activity, e.g. financial transaction, would not be authorised.

In some embodiments, the voice authentication module 111 may be enabled by a voice activity event which is detected, for example, by the codec/DSP 107 or another dedicated module (not shown). For example, when the device 100 is in a low-power sleep mode, any voice activity may be detected and a signal VAD (voice activity detected) communicated to the voice authentication module 111. In the event of a positive user authentication, the signal BioOK may be used by the AP 108 to alter the state of the device 100 from the low-power sleep mode to an active mode (i.e. higher power). If the authentication result were negative, the mode change may not be activated.

In some embodiments, there may be a signal path 112 for providing audio data directly from a microphone 101 to the voice authentication module 111 for the purposes of voice authentication. However in at least some embodiments and/or for some use cases audio data from microphone 101 of the electronic device 100 or from a microphone 102 of an accessory apparatus 103 may be provided to the voice authentication module 111 via the AP 108 and/or via codec/DSP 107 or via a path including some other processing modules.

Whilst voice authentication module 111 has been illustrated as a separate module in FIG. 1 for ease of reference it will be understood that the voice authentication module 111 could be implemented as part of or integrated with one or more of the other modules/processors described, for example, with speech recognition module 110. In some embodiments, the voice authentication module 111 may be a module at least partly implemented by the AP 108 which may be activated by other processes running on the AP 108. In other embodiments, the voice authentication module 111 may be separate to the AP 108 and in some instances, may be integrated with at least some of the functions of the codec/DSP 107.

As used herein, the term 'module' shall be used to at least refer to a functional unit of an apparatus or device. The functional unit may be implemented at least partly by dedicated hardware components such as custom defined circuitry and/or at least partly be implemented by one or more software processors or appropriate code running on a suitable general purpose processor or the like. A module may itself comprise other modules or functional units. The term "block" shall be in the same way as module.

The voice authentication module 111 thus provides a way for a user to verify that they are an authorised user in order to access some information or service. As mentioned the voice authorisation may be used to access sensitive information and/or authorise financial transactions etc. Such an authentication may, in practice, be subject to an attack, i.e. an attempt by an unauthorised user to falsely obtain access to the information or service.

There are various ways in which a voice authentication system for an electronic device such as a smartphone or the like could potentially be attacked. In theory, if an attacker had access to the device itself, the attacker could attempt to interfere with the operation of the voice authentication module 111 of the device, by electrically modifying the module, however such an attack would have a number of practical difficulties and may not be of significant concern or could be protected against by some anti-tamper measures.

The voice authentication module 111 itself may thus be considered secure, in that an authentication signal from the voice authentication module 111 cannot be faked, for example, the voice authentication module 111 will only generate an authentication signal indicating that authentication is successful if the audio input supplied to the voice authentication module 111 does match the registered user.

However, it is conceivable that an attacker could falsely generate audio data and attempt to provide such false audio to the voice authentication module 111 as if it were genuine audio data from a registered user speaking at that time, the false data being selected to have a high chance of being falsely recognised as matching the registered user.

For instance, it may be possible for an attacker to defeat voice authentication by recording a registered user speaking without their knowledge and using such recording later when attacking a secure service. Such recorded audio may thus genuinely correspond to the registered user, but is used falsely during an attempt to access some service which is not authorised by the registered user. As used herein the term 'false audio' shall thus refer to audio which has been synthesised or modified in some way so that it does not relate to audio actually spoken, in real time, by a user and also audio which was genuinely spoken, in real time, by the user but which is being used falsely. Audio leaving a user's mouth can be regarded, in the context of this application, as primary audio and any subsequently synthesis, modification or the like of the may be thought of as secondary audio.

There are various routes in which such false audio, i.e. secondary audio, could be supplied to the voice authentication module 111.

As noted above, in at least some embodiments and/or for some use cases, audio data from microphone 101 of the electronic device 100, or from a microphone 102 of an accessory apparatus 103, may be provided to the voice authentication module 111 via the AP 108 or via some communication path that may be configured or controlled by the AP 108. The AP 108 may typically be capable of running many different applications or software processes and may be configured so that software processes can be installed from outside sources by a user directly into the processor 108 and associated memory 109, for instance via connector 105 or via the wireless module 106 for example. This provides a route for malicious software (malware) to be installed surreptitiously, and for this malware to corrupt the operation of the voice authentication.

For example it may be possible that malware could be installed to run on an insecure area of the AP 108 and which may attempt to access a service which requires authentication from the voice authentication module 111. The malware may for instance control a communications bus that is capable of supplying audio data to the voice authentication module 111 so as to supply false audio, e.g. previously recorded data or synthesised data, to the voice authentication module 111 in an attempt to achieve authentication. If malware were installed on the user's device, the malware may be arranged to record the user's voice (using the user's device) without the user being aware. Such recorded audio could be used as the basis of an attempt to achieve authentication by an attacker.

To guard against such an attack using a recording of a user's voice it is known for some applications that use voice biometric authentication to, in the event that a request to access a secure service is received, generate a prompt to prompt the user to say one or more selected words or phrases. The words or phrases may be selected with a degree of randomness so as to vary each time in an unpredictable way. This requires the user to utter the words or phrase corresponding to the prompt. If the correct prompt is then uttered and the voice corresponds to the relevant user then the authentication result may be positive, otherwise the authentication will fail, i.e. produce a negative authentication result.

However if the number of possible prompts is relatively small it may be possible for an attacker to obtain a recording of at least some of the possible prompts and supply the appropriate prompt if asked. It may also be possible for an attacker with a recording of the registered user voice to attempt to synthesise audio data for the required prompt. For example, if malware has been inadvertently installed in the electronic device 100 then, as the AP 108 controls the codec/DSP 107 and may be configured for recording, it is possible that the malware could be configured to, unknown to the user, record and/or analyse voice data from the user over time. When sufficient data has been recorded and/or analysed the malware may attempt to access the secure service. The secure service may then generate a voice prompt and alert the voice authentication module 111 to perform authentication. The malware may identify the selected voice prompt and then supply an audio signal which is synthesised or formed from the various recordings of the user's voice to correspond to the requested prompt. If this faked audio signal is good enough the voice authentication module 111 will recognise the audio as corresponding to the registered user and also corresponding to the selected voice prompt and falsely generate a positive authentication result. The use of malware, whether installed in the electronic device 100 or elsewhere, to provide false digital audio data to the voice authentication module 111 may allow a large number of attacks to be performed in a short period of time. Such attacks may be considered scalable as multiple attempts to achieve biometric verification may be made and digital audio data may be provided at fast data rates, above normal audio sample rates.

In some instances therefore the codec 107 could be arranged to certify, in some way, any audio data transmitted from the codec 107 which is intended for the voice authentication module 111. For instance the codec 107 may be arranged to generate some sort of authentication certificate based on the audio data being transmitted and digitally sign, e.g. cryptographically sign, the authentication certificate. The voice authentication module 111, when receiving audio data, could determine whether there is a genuine authentication certificate that corresponds to the codec 107 and which is valid (at that time) for the received data. If there is a genuine valid certificate the voice authentication module 111 can trust that audio data was received from the codec 107 and has not been tampered with.

The same principle could be applied to digital audio data received from an accessory apparatus 103/103a. Thus an accessory apparatus could have a certification module for processing the digital audio data prior to transmission to the host device to generate a suitable authentication certificate of the audio data, which may be robust to lossy processing of the audio data. The authentication certificate may then be transmitted along with the digital audio data to allow the host device to verify that the audio data was received from a genuine accessory apparatus. This would however require the accessory apparatus 103/103a to output digital audio data and to have a certification module for generating a suitable authentication certificate.

The use of a certification module to generate an authentication certificate based on the audio data could therefore allow for detection of any tampering with the audio data, or injection of false audio data, downstream of the certification module. However in some implementations it may not be possible or practical to provide such a certification module. Also in practice any such certification module would be implemented in the digital domain and even with a certification module of this type the system could be vulnerable to injection of false audio upstream.

For example in some implementations audio data could be provided to the voice authentication module 111 directly as analogue audio data, e.g. via a signal path 112 from an on-board microphone 101 or from a microphone of an accessory apparatus 103. In such a case the audio data would be converted to digital within the voice authentication module 111 and there would not generally be any certification module in the analogue signal path. In theory such an implementation could be vulnerable to false audio data being injected as analogue audio data at a part of the signal path between the microphone 101/102 and the voice authentication module 111.

As noted above if analogue audio data is provided to the codec 107, e.g. from microphone 101 or 102, and the codec 107 digitises the data and forwards the data to the voice authentication module 111, false audio data can be injected into the codec 107 or between the codec 107 and the voice authentication module 111. A certification module for generating a suitable authentication certificate could be used to protect against any downstream tampering between the codec 107 and voice authentication module 111. However if the codec 107 has variable signal routing it may be possible for malicious software to provide rerouting of the codec 107 so as to provide false analogue audio to a certification module of the codec 107, if present.

Similar issues exist for digital microphones which output digital audio data where the digital microphone is not associated with some sort of certification module.

In embodiments of the present disclosure a microphone authentication apparatus may therefore analyse data indicative of at least part of an audio signal to be verified, so as to determine whether the audio signal includes a signal component which is characteristic of a microphone. In particular the authentication apparatus may compare a first signal indicative one or more spectral parameters of at least part of the audio signal with one or more predetermined characteristic microphone parameters relating to a characteristic resonance associated with an acoustic port of a microphone, e.g. a Helmholtz resonance of the microphone acoustic system.

As will be understood by one skilled in the art a microphone, such as microphone 101 of the device 100, will typically be packaged in a protective housing and the interior of the housing will be acoustically coupled to an acoustic port for conducting pressure waves into the housing.

Figure 2A:
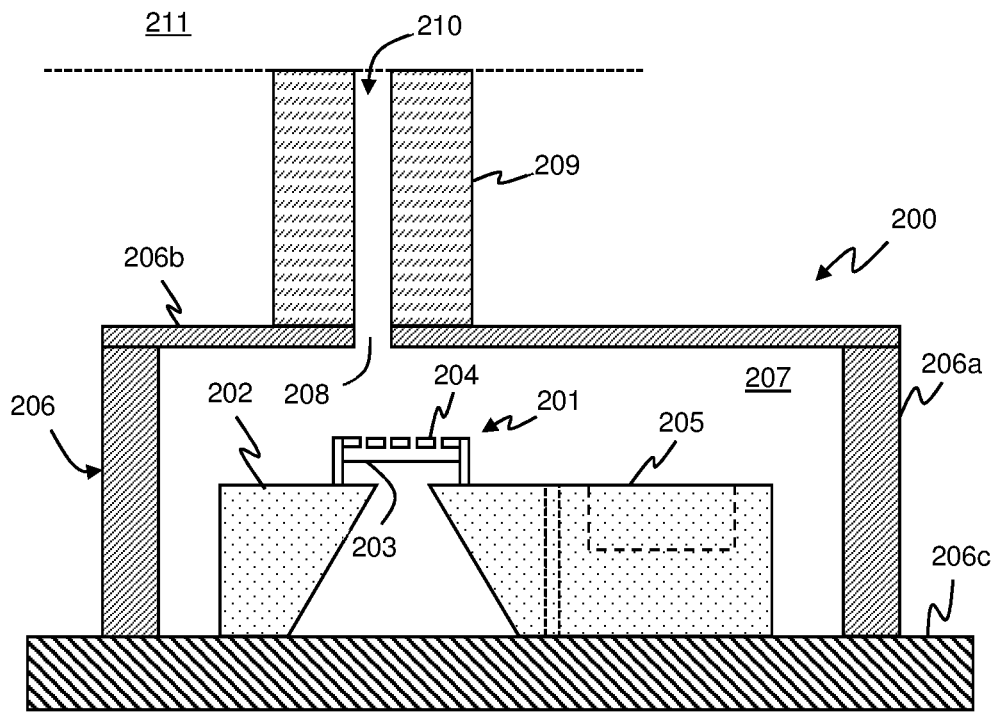

FIG. 2a illustrates one example of a packaged microphone device 200 having an acoustic port. In this example the microphone package comprises a MEMS microphone transducer 201 formed on a transducer substrate 202. The transducer 201 typically comprises a membrane or diaphragm 203 that may be displaced by an incident pressure wave, e.g. an acoustic stimulus. Note that as used herein the term acoustic shall be used to refer to any type of pressure wave that may propagate through air to deflect the membrane or diaphragm including, but not limited to, pressure waves at frequencies audible to a human, i.e. audible sound. For the avoidance of doubt, the term acoustic shall be taken to include signals at ultrasonic frequencies.

The membrane or diaphragm 203 forms or carries a first electrode (not illustrated separately in FIG. 2). The membrane or diaphragm 203 is supported relative to at least one fixed back-plate structure 204 that has a second electrode (also not illustrated separately in FIG. 2). In response to an incident acoustic wave the moveable first electrode of the diaphragm 203 may tend to be displaced with respect to the fixed second electrode of the back-plate 204. By driving, i.e. biasing, the first and second electrodes with suitable voltages a measurement signal corresponding to the incident acoustic wave can be determined by monitoring the change in electrical properties, for example through measuring the change in capacitance due to deflection of the first electrode relative to the fixed second electrode.

The MEMS transducer structure is thus typically coupled to biasing/read-out circuitry 205 and in some embodiments the transducer 201 and biasing/read-out circuitry 205 are formed as an integrated circuit on the same substrate 202, i.e. the transducer 201 and biasing/read-out circuitry 205 are formed on a monolithic die. In other embodiments the biasing/read-out circuitry 205 may be formed on a separate die to the MEMS transducer structure, as indicated by the two vertical dashed lines within substrate 202 representing the edges of the respective dies in such an arrangement.

In either case, the transducer 201 and circuitry 205 are typically packaged together within a housing or package 206. The housing may comprise side wall portions 206a, a lid portion 206b and a base portion 206c. In some instances, at least some of these portions of the housing, i.e. package, may be formed from continuous material, e.g. the side wall portion 206a and lid portion 206b may be formed from a shaped metal sheet and bonded to the base, i.e. substrate portion 206c. However in some instances the package may comprise separate components joined together to form the housing and may, for instance, be formed at least partly from printed circuit board (PCB) material such as FR4. In some instances, part of the transducer substrate 202 may form part of the housing structure.

It should be noted that electrical connections between the various components and from the components within the package 206 to connections outside the package have been omitted from FIG. 2a for clarity, and the various ways in which such connections may be implemented will be understood by those skilled in the art.

FIG. 2a shows a MEMS microphone, but the same principles apply for other types of microphone, such as ECM microphones, in which the transducer and some electronics are packed together in a small housing.

The housing 206 thus defines a cavity, or chamber, 207 within which the transducer 201 resides. To allow acoustic waves to reach the transducer 201, the housing 206 has a housing port 208, e.g. a hole or opening, which in this example is illustrated as being in the cover, i.e. lid, of the package. It will be understood by those skilled in the art that the housing port 208 may alternatively be located in the substrate portion 206c or the side wall portion 206a. The housing port 208 may be located directly under the transducer 201 so as to communicate directly with a cavity or volume in the transducer die, rather than communicating directly with chamber 207. Thus the housing port 208 may be an opening, somewhere suitable, in the housing 206, although in some examples the housing port 208 may be at least partly sealed with some flexible membrane material or a mesh of some material to provide a substantially acoustically transparent port for transmission of acoustic waves but to provide a barrier, i.e. an environmental barrier, to ingress of moisture, dirt etc. The housing port 208 thus forms at least part of an acoustic port for the transmission of acoustic waves to the transducer 201 within the housing 206.

In some instances, when such a microphone device is included in an assembled host device, the housing port 208 may be coupled to a structure 209, that at least partly defines an acoustic channel or waveguide for propagation of acoustic waves from a desired location, e.g. from the outside 211 of the host device, to cavity 207 within the microphone package 206 via the housing port 208. For instance, structure 209 could be a gasket or the like. In such instances, the channel 210, defined partly by guide structure 209 and partly by the housing port 208 can be seen as an acoustic port of the microphone device. In some instances, however, the channel structure 210 may not be needed, for instance if the microphone package is located in a part of the host device that can readily receive acoustic waves of interest, in which case the acoustic port of the microphone may comprise the housing port alone. It will also be understood that other implementations for arranging a packaged microphone to receive acoustic signals of interest, but in general there will be an acoustic port associated with the packaged microphone.

Such an acoustic system of an air volume or cavity 207 in fluid communication with the environment via an acoustic port 210 will exhibit a characteristic resonance, often referred to as the Helmholtz resonance. This resonance is a resonance of the air within the system and thus will be referred to herein as an "air resonance" or an "acoustic resonance". For instance, when air passes over the entrance to the acoustic port 210 a Helmholtz resonance may be excited. In everyday use of the acoustic system air may flow past the entrance to the acoustic port 210 due to air currents or wind, acoustic stimuli (e.g. background noise) or movement of the host device through the air etc. and thus, a Helmholtz resonance may be spontaneously excited within the acoustic port 210 at various times. Acoustic signals passing to the transducer via the acoustic port will also excite the Helmholtz resonance. In general however due to the relatively small size of the acoustic system the Helmholtz resonance will always be present, to at least some degree, as effectively thermal noise due to the Brownian motion of air molecules within the cavity and acoustic port. Thus some Helmholtz resonance component may always be present in a microphone signal from such a microphone. The Helmholtz resonance will have some characteristic parameters, for instance a characteristic frequency profile around a resonance frequency (the Helmholtz frequency $f_H$) which is related to the dimensions of the acoustic system, e.g. the physical dimensions of the acoustic port 210 and internal cavity 207 of the microphone housing 206.

In essence the acoustic path from the outside world to the transducer can be modelled as acoustic impedances, inductances and capacitances. In the example illustrated in FIG. 2a, there is an acoustic impedance related to coupling of pressure waves from outside 211 the host device to the acoustic port, in series with an acoustic inductance due to the acoustic port 210 itself and a further acoustic impedance related to the interface between the acoustic port 210 and the cavity 207. The cavity 207 also functions as an acoustic capacitance. This acoustic path can be modelled and behaves as a resonator.

This resonance may occur at a resonance frequency within the signal band detectable by the microphone transducer 201. The resulting microphone signal from the MEMS transducer may therefore contain a signal component with the characteristic frequency profile associated with this Helmholtz resonance $f_H$.

Figure 2B:
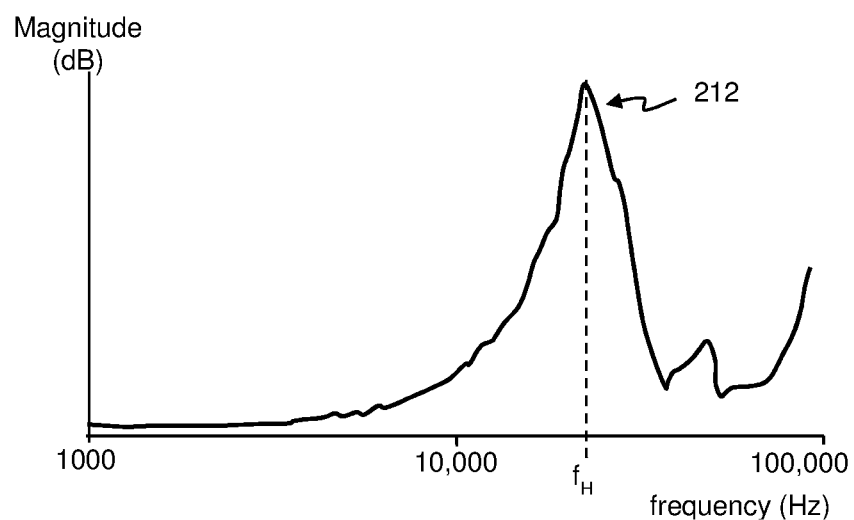

FIG. 2b illustrates an example of the spectrum of a microphone signal from a packaged microphone having an acoustic port 210, for example for a microphone package such as shown in FIG. 2a. Such a signal, recorded in the absence of any specific acoustic stimulus being applied to the microphone, is indicative of the general background signal produced by the microphone due to thermal noise due to random movement of the air molecules in the port or cavity of the packaged microphone. FIG. 2b illustrates a plot of power spectrum density (in dB in this case) against frequency for the microphone signal, i.e. is a spectrogram of the output signal from the microphone output from the readout circuitry 205. It can clearly be seen that a peak 212 occurs in the plot, which in this instance has a peak frequency, i.e. a resonance frequency $f_H$, of around 22 kHz.

This peak 212 in the microphone signal is caused by the resonance associated with the acoustic system, i.e. acoustic port 210 leading to cavity 207 as discussed above. Analysis shows that, for a system such as illustrated in FIG. 2a, to first order the peak resonance frequency $f_H$ of this Helmholtz resonance can be estimated (to a first order) as:

$$f_H = c\sqrt{\frac{S_A}{lV}}. \quad (1)$$

where V is the volume of cavity 207, l is the length of the acoustic port 210, $S_A$ is the area of the opening of the acoustic port 210, and c is the speed of sound in the air in the acoustic port 210 and cavity 207.

The Helmholtz frequency may also be associated with a quality factor. To a first order analysis, the quality factor $Q_H$ of a microphone arrangement such as illustrated in FIG. 2a may be given by:

$$Q_H = 2\pi\sqrt{V\left(\frac{l}{S_A}\right)^3} \quad (2)$$

where V, l and $S_A$ are the cavity, i.e. chamber, volume, port length and port area respectively as defined above for equation 1.

Embodiments of the present disclosure thus make use of the fact that, for a microphone 101 of an on-board device or a microphone 102 of an accessory device, the audio signal from the microphone would be expected to have a signal component with such a resonance frequency profile, i.e. there would be a signal component with some characteristic spectral parameters related to the acoustic resonance. Thus the absence of the characteristic air/acoustic resonance frequency profile in an audio signal may indicate that such an audio signal did not originate from the relevant microphone, i.e. that the audio signal is not the output of the microphone or derived (faithfully) therefrom. For instance this could be an indication of that the relevant audio signal has been artificially synthesised. Thus the presence of a signal component corresponding to the characteristic resonance frequency profile could itself be indicative of the source of audio signal being a microphone, whereas the absence of such a signal component may be indicative that the audio was not genuinely generated by a microphone. In some implementations the authentication apparatus may determine whether the audio signal was generated by any microphone. The absence of any resonance component that could correspond to an acoustic port resonance of a microphone, may be used as an indication that the audio was not received via any microphone, for example the audio may have been synthesised.

In some implementations however, when an audio signal is received and is purported to be from a particular microphone, i.e. a specific known microphone, and the characteristic resonance frequency profile for that microphone is known, data indicative of at least a relevant part of the audio signal could be analysed to determine whether a signal component is present that matches an expected characteristic resonance frequency profile for that microphone. This may allow the microphone authentication apparatus to verify whether or not the audio signal did originate at the relevant microphone.

It should be noted that as used herein the term "audio" is not intended to refer to signals at any particular frequency range and is not used to specify the audible frequency range. The audio signal may encompass an audible frequency range and where the audio signal is provided for voice biometric authentication the audio signal will encompass a frequency band suitable for voice audio. However the audio signal which is verified may additionally or alternatively comprise higher frequencies, e.g. ultrasonic frequencies or the like. The term audio signal is intended to refer to a signal of the type which may have originated from a microphone, possibly after some processing.

Figure 3:
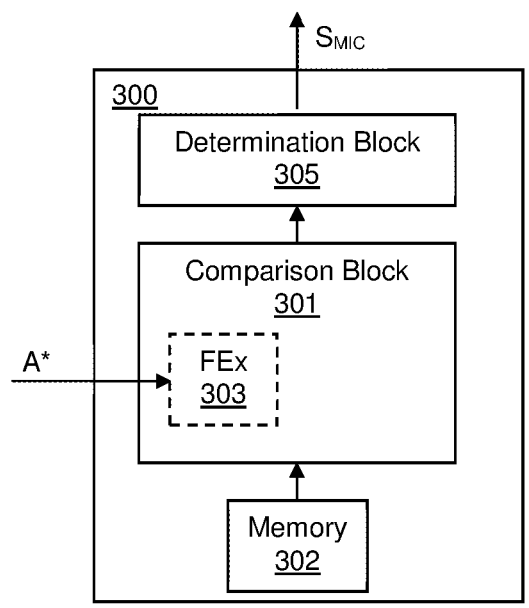
FIG. 3 illustrates a microphone authentication apparatus according to some embodiments.

FIG. 3 illustrates a microphone authentication apparatus 300 according to an embodiment. The microphone authentication apparatus 300 is configured to verify whether an audio signal originated from a microphone.

The microphone authentication apparatus 300 receives a first signal A* which is indicative of one or more spectral parameters of at least part of the relevant audio signal A to be verified. In some instances the first signal A* may itself be the audio signal A to be verified, or a version thereof. For instance if the audio signal to be verified is an analogue audio signal that has been received, the first signal could be a digital version of the received audio signal or a processed version of the digital audio signal. If the audio signal to be verified is a digital signal, the first signal could be the received digital signal or copy or processed version thereof. In some instances the first signal could correspond to only part of the audio signal to be verified, for instance the first signal may correspond to a frequency band of interest within the audio signal, the frequency band being a relevant frequency band for an expected characteristic acoustic resonance, if present. If the first signal comprises the relevant part of the audio signal to be verified, the audio signal will contain any component due to a resonance associated with a microphone, from which the relevant spectral parameters can be identified.

The microphone authentication apparatus 300 comprises a comparison block 301, which receives the first signal A*, and compares spectral parameters derived from the first signal A* to one or more predetermined characteristic microphone parameters relating to a characteristic resonance associated with an acoustic port of the microphone, for example the Helmholtz resonance.

The predetermined characteristic microphone parameters, which may be stored in memory 302, may be any parameters that at least partly define or characterise an expected characteristic resonance associated with an acoustic port of the microphone. For instance the characteristic microphone parameters may comprise an expected peak frequency of the characteristic resonance, i.e. the resonance frequency $f_H$, or a range of expected peak frequencies and/or an expected quality factor of the characteristic resonance, i.e. the quality factor of the resonance peak in the audio signal, or a range within which the quality factor would be expected to lie. In some instances the characteristic microphone parameters may comprise parameters defining a particular function, e.g. a parabolic curve, mapped to the expected resonance frequency profile.

In instances where the first signal A* comprises at least part of the audio signal to be verified, the comparison block 301 may determine spectral parameters from the audio signal that correspond to the predetermined characteristic microphone parameters. For instance within a signal band of interest for an expected acoustic resonance associated with a microphone the comparison block could identify any peak frequency and/or a quality factor associated with a signal component. The comparison block 301 may therefore, in some instances comprise a feature extract module 303 for determining the relevant spectral parameters from the first signal for comparison with the predetermined characteristic microphone parameters, as will be described in more detail below.

In some instances the characteristic microphone parameters may comprise an indication of how at least some parameters, for example the expected peak frequency of the characteristic resonance, may be expected to vary with temperature, or a range of expected parameter values, e.g. a range of peak frequencies, across the range of expected operating temperatures. As noted above with respect to equation (1) the resonance frequency may depend on the dimensions of the acoustic system but also the speed of sound in air, which will vary with air temperature.

In some instances an indication of air temperature of the relevant microphone may be available. For instance some devices 100 may have temperature sensors which provide an indication of air temperature for some other reason. If available an indication of air temperature from a sensor of an electronic device may be used as an indication of the air temperature for a microphone 101 of a host device 100 or possibly for a microphone 102 of an accessory apparatus which, is in the vicinity of the host device 100. The predetermined characteristic microphone parameters may thus be selected and/or modified based on the indication of air temperature so as to have appropriate values for the likely operating temperature.

In some instances the characteristic microphone parameters may comprise an indication of an expected quality factor of the characteristic resonance, i.e. the quality factor of the resonance peak in the audio signal, or a range within which the quality factor would be expected to lie. As noted above in relation to equations (1) and (2) both the resonance frequency $f_H$ and quality factor $Q_H$ of the acoustic resonance depend on the relevant dimensions of the acoustic system, but whilst the resonance frequency depends on the speed of sound and thus varies with air temperature, the quality factor does not. The quality factor thus defines a relatively constant feature of the frequency profile of the resonance of a particular acoustic system, assuming the dimensions do not change, e.g. the acoustic port does not become blocked. It will be understood that partial or full blocking, i.e. occlusion, of the acoustic port, e.g. through dirt or foreign objects becoming located in the acoustic port, could result in a change in peak resonance frequency and quality factor of the acoustic resonance. However such a change would be a variation in one direction only as any blockage would be expected to only increase in degree.

In some implementations an expected range of resonance frequency and/or quality factor for a resonance peak may be defined for a variety of different microphones from which it is expected that an audio signal could originate in use. In other words at least one set of generic microphone parameters could be defined without knowledge of the characteristics of a particular microphone and its associated acoustic system. Such a set of generic microphone parameters could thus effectively define the likely properties of an acoustic resonance of a microphone, which could possibly be an on-board microphone 101 of the host device and/or could possibly be a microphone 102 of an accessory apparatus.

In such a case the comparison block 301 would compare the spectral parameters of the first signal A* to the set of generic microphone parameters to effectively determine whether the first signal has a signal component that corresponds to a Helmholtz resonance.

In some instances however the characteristic microphone parameters may additionally or alternatively comprise at least one set of microphone parameters that correspond to properties of the acoustic resonance of a specific microphone. Thus, for example, for an on-board microphone 101 of a host device, the particular type of microphone and associated acoustic system will be known. In this case microphone parameters regarding the properties of the specific acoustic resonance associated with that specific microphone may be available. Such microphone parameters could be based on properties of the microphone determined in a factory calibration step, e.g. under controlled test conditions, and/or historic data from other instances of the same microphone arrangement. In some instances the characteristic microphone parameters could parameters of, or derived from, a model of the acoustic resonance of the microphone based on the known type of microphone and acoustic system and/or historic or calibration data.

Such a set of specific microphone parameters may thus define the acoustic resonance associated with the specific microphone. In such a case the comparison block 301 may compare the spectral parameters of the first signal A* to the set of specific microphone parameters to determine whether the first signal has a signal component that corresponds to the Helmholtz resonance expected for that particular microphone. This would not only indicate when the first signal lacks any Helmholtz resonance at all, for example possibly indicating a synthesised audio signal, but would also indicate whether the first signal has a Helmholtz resonance but with quite different properties to the expected properties for that particular microphone, for example possibly indicating that the audio signal was obtained using a different microphone and thus could be a recording.

For an on-board microphone 101 of the host device the relevant specific characteristic microphone parameters may be determined at device fabrication stage and stored in memory 302. If however the microphone authentication apparatus is to be used for verification of audio signals that may originate from a microphone 102 of an accessory apparatus 103 that may be connected to the host device in use, then clearly a range of different accessories, with different microphones and different acoustic systems could be used at different times.

In some implementations it may be possible to register or enrol certain accessories with the microphone authentication apparatus 300 and characterise an acoustic resonance associated with a microphone 102 of that specific accessory 103. For instance if a host device detects that an accessory apparatus with a microphone is connected, it may activate the microphone authentication apparatus 300 to compare a first signal A* indicative of the audio signal from the microphone of the accessory to any specific set of microphone parameters stored in memory 302. In the event that there is no match, the host device could be configured to ask the user if they want to register the accessory, in which case the user's identity may be verified through other means, e.g. input of a password, voice biometric identification using an already characterised on-board microphone, other biometric identification etc., and once the user identity is verified the audio signal from the accessory apparatus may be analysed to determine properties of an acoustic resonance associated with the microphone which can be used to store specific characteristic microphone parameters in memory 302 for that microphone of the accessory. In practice a user may have only a few accessories with microphones that they use with a host device and thus the user may only have to register the microphones of accessory devices infrequently.

As mentioned the microphone parameters stored for a microphone may be any parameter that characterises or defines the acoustic resonance, e.g. Helmholtz resonance, associated with a microphone. This could for instance comprise an expected profile of the resonance peak, e.g. the expected relative signal power at different frequencies around the peak frequency $f_H$. In some instances a model of the acoustic resonance could be stored in memory 302 and spectral parameters obtained from the first signal A* could be compared to microphone parameters of or derived from the model.

A determination block 304 is responsive to the comparison block 301 and is configured to determine, based on the comparison, whether the audio signal originated at a microphone. In effect the determination block 304 determines whether the first signal A* is representative of the characteristic resonance. For example, if the comparison block 301 indicates to the determination block 304 that the one or more spectral parameters of first signal A* are effectively a match for the characteristic microphone parameters, the determination block 304 may then determine that the first signal A* is representative of the characteristic resonance frequency. In contrast, if the comparison block 301 indicates to the determination block 304 that the spectral parameters of the first signal A* do not match the characteristic microphone parameters, the determination block 304 may then determine that the first signal A* is not representative of the characteristic resonance frequency.

The determination block 304 may be configured to output a microphone verification signal $S_{MIC}$ indicating whether or not the audio signal is determined to have originated at a microphone. The microphone verification signal $S_{MIC}$ may indicate whether or not the first signal A* indicates that there is a match to a set of generic microphone parameters, e.g. an indication of whether or not the first signal A* indicates that there is any Helmholtz resonance in the audio signal. In which case the microphone verification signal $S_{MIC}$ may indicate whether or not the audio signal is determined to have originated at any microphone.

As noted above however in some embodiments the microphone verification signal $S_{MIC}$ may indicate whether or not the first signal A* indicates there is a match to a specific acoustic resonance of a specific microphone, in which case the microphone verification signal $S_{MIC}$ may be a verification as to whether or not a resonance in the audio signal matches a resonance of a known microphone. If there is a set of specific microphone parameters for more than one microphone, the microphone verification signal $S_{MIC}$ may identify the relevant microphone which the resonance matches and the microphone verification signal $S_{MIC}$ may indicate whether or not the audio signal is determined to have originated at a specific microphone.

The microphone authentication apparatus 300 can thus verify whether or not an audio signal originated at an expected microphone. If it is determined that the audio signal did not originate at an expected microphone this could be an indication that the audio signal is a false audio signal. This may be used to generate an alert of a possible attack of the voice biometric authentication system and/or as part of the security of the voice biometric authentication system.

Figure 4:
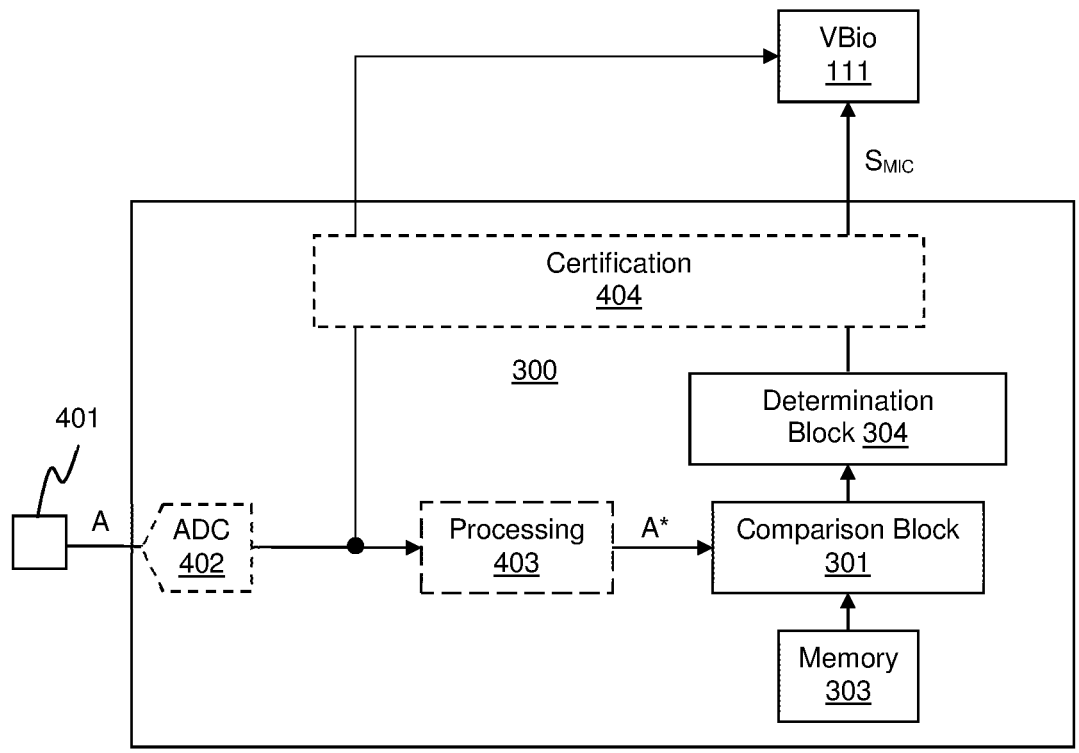
FIG. 4 illustrates an example of an authentication system having a microphone authentication apparatus according to some embodiments.

FIG. 4 illustrates one example of how a microphone authentication apparatus 300 of the type described with reference to FIG. 3 may be arranged to provide security for voice biometrics.

In the example of FIG. 4 an input audio signal A is received at a node 401, which it is wished to verify originated from a microphone. In some instances the microphone authentication apparatus 300 may be arranged as part of a trusted domain with the voice authentication module 111, and the input node 401 may be an input to the trusted domain. For instance the microphone authentication apparatus 300 may be implemented at part of a voice authentication system, e.g. on a secure voice biometric chip together with the voice authentication module 111. This may especially be the case if analogue audio signals are provided to the voice authentication module 111.

In some embodiments however the input node could, for instance, be a node of a codec/DSP 107 arranged to receive audio signals from on-board microphone 101 or microphone 102 of an accessory apparatus 103 when connected, and the microphone authentication apparatus 300 may be configured for secure communication with the voice authentication module 111 as will be discussed in more detail below.

In some instance the input audio signal A may be an analogue audio signal, in which case there may be an analogue-to-digital converter (ADC) 402 to convert the input analogue signal into a digital signal. In this case the sample rate of the ADC 402 should be high enough for the frequency range of interest for the resonance signal component. As mentioned previously the signal component corresponding to a Helmholtz resonance for a microphone may be expected to lie towards a relatively high frequency part of the signal band, e.g. of the order of 20 kHz or higher. The sample rate of the ADC 402 should thus be high enough, i.e. above the Nyquist rate, to ensure that the digital version of the audio signal contains this relatively high frequency information such that the relevant spectral parameters can be extracted.

In some instances however the input audio signal A may be a sufficiently high sample rate digital signal, e.g. from a suitable digital microphone or received from some upstream ADC.

The digital audio signal may be provided to the comparison block 301 as the first signal A* and compared to microphone data stored in memory 302 as discussed above in relation to FIG. 3.

In some embodiments however the microphone authentication apparatus may apply at least some processing to the digital audio signal to produce the first signal A* and the microphone authentication apparatus 300 may further comprise a processing module 403. The processing module 403 comprises an input configured to receive the digital audio signal A, and an output configured to output the first signal A* to the comparison block 301. The processing module 403 may be configured to output, as the first signal A*, an indication of any component of the audio signal A in a predetermined frequency range in which the characteristic resonance frequency is expected to occur. For example, for a microphone having a Helmholtz frequency feature as shown in FIG. 2b, the processing module 403 may be configured to output an indication of the components of the audio signal A occurring in the frequency range 12 kHz to 35 kHz. In some embodiments therefore the processing module 403 may comprise a band pass filter or similar.

In some embodiments, the processing module 403 may process the digital audio signal to extract the spectral parameters of any resonance component present in a predetermined frequency band in the audio signal A, i.e. signal band of interest in which the Helmholtz frequency is expected to occur, and provide data regarding said parameters as the first signal A*. In other words the processing module 403 may implement the functionality of the feature extract module 303 discussed above and the first signal may not be an audio signal as such but could be a signal indicative of the relevant spectral parameters of the audio signal A. The first signal A* could thus be seen as metadata to the digital audio signal which characterises any acoustic resonance in the audio signal A. Such parameters may comprise for example the resonance peak frequency $f_H$ and/or a quality factor $Q_H$ for the resonance peak or parameters of a function, such as a parabolic curve, describing the spectrum of the resonance component.

If the processing module 403 extracts such parameters the comparison block 301 may simply compare the parameter values contained in the first signal A* to the microphone data. If however the first signal A* which is provided to the comparison block is at least part of an actual audio signal the comparison block 301 may be configured to determine parameters such as the peak resonance frequency $f_H$ and/or quality factor $Q_H$ from the first signal, e.g. via a feature extract module 303 as discussed above.

There are a variety of ways in which such spectral parameters related to any Helmholtz resonance component in the audio signal may be determined whether by a processing module 403 or feature extract module 303.

For example to determine a value for the peak resonance frequency $f_H$, the audio signal could be processed to provide an indication of the signal magnitude at a variety of different frequencies across at least a frequency range of interest. Maximum $A_{max}$ and minimum $A_{min}$ signal magnitude values within the frequency range of interest, e.g. between two defined frequency values $F_1$ and $F_2$, may then be determined. For instance, in one example the resonance frequency $f_H$ may be expected to fall within a frequency range between 12 kHz and 35 kHz and resonance frequency detection may be applied over this frequency range.

Having identified the maximum $A_{max}$ and minimum $A_{min}$ values of the signal magnitude, i.e. a signal magnitude range, in the frequency range of interest, a first threshold $T_1$ may be determined above which it is expected substantially all of the relevant signal contribution is due to the resonance peak. The signal magnitude values above the first threshold $T_1$ may then be integrated across the frequency range from $F_1$ to $F_2$ to determine a total integral value. The value of a first frequency $FR_1$ may be determined where the integral corresponds to half of the total value. At this first frequency $FR_1$, half of the total signal magnitude above the first threshold $T_1$ is at higher frequencies and half is at lower frequencies. Assuming that the resonance peak is largely evenly spread about the resonance frequency $f_H$, e.g. the shape of the peak is reasonably symmetric, the value of the first frequency $FR_1$ thus corresponds to the resonance frequency $f_H$.

The first threshold $T_1$ should be high enough so that any signal magnitude above the first threshold $T_1$ is expected to be part of the acoustic spectral resonance peak, i.e. due to the resonance of acoustic port 210, but should be low enough to include a reasonable width of the resonance peak. A threshold of the order of 50-70%, say about 60% of the signal magnitude range between $A_{max}$ and $A_{min}$ may be used in some embodiments.

It will be appreciated, however, that other methods for finding the value of this peak resonance frequency $f_H$ associated with the acoustic port 210 may be used. For instance, in some embodiments the peak resonance frequency $f_H$ may simply be assumed to be the frequency with the highest signal magnitude in the frequency range of interest.

In some embodiments, curve fitting could be employed to determine at least some spectral parameters of any signal component corresponding to an acoustic resonance associated with the microphone, for instance the quality factor $Q_H$. For instance a plurality of points associated with the resonance peak in a spectrogram of the audio signal could be determined and a curve, e.g. a parabolic curve, fitted to said points. A quality factor $Q_H$ can then be determined from the fitted curve and/or the points defining the relevant function, e.g. parabolic curve, could be used as the relevant spectral parameters.

In one example, a first point could be determined corresponding to the spectral peak, i.e. the frequency and signal magnitude at the peak. The processing module 403 may then step a defined frequency interval on either side of this first point and determine the relevant signal magnitudes for those frequencies to provide second and third points. The relevant frequency step may be chosen according to the particular implementation and may, for instance by determined partly by the resolution of the second signal A.

Figure 5:
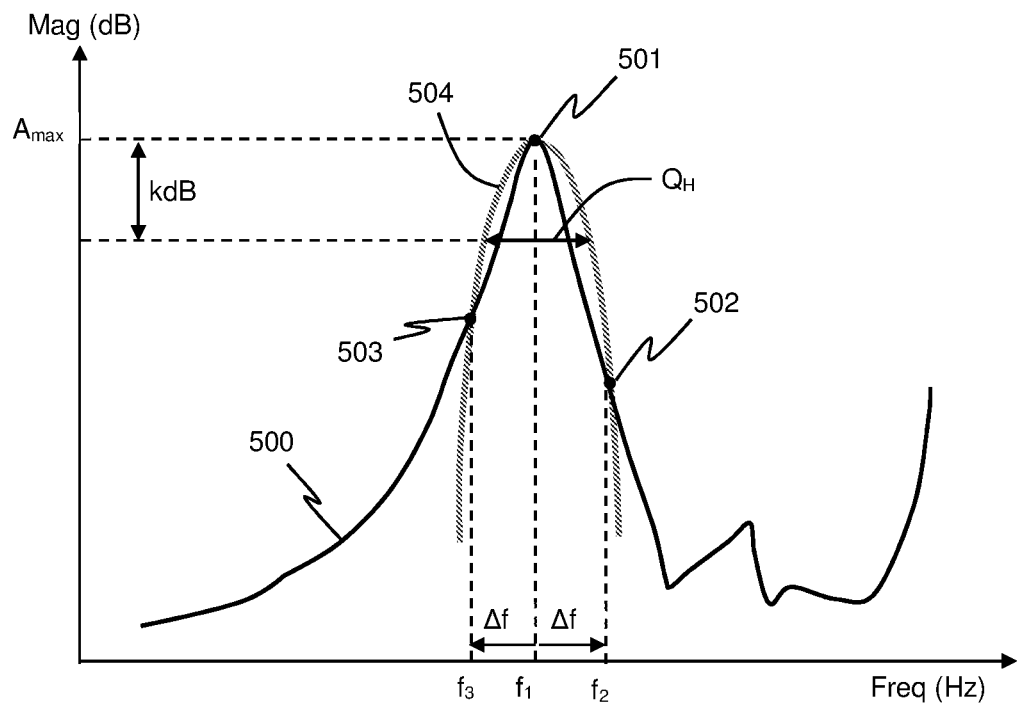
FIG. 5 illustrates an example spectrogram of signal magnitude against frequency over a frequency range of interest for an example resonance.

FIG. 5 illustrates an example of this approach. FIG. 5 illustrates an example plot 500 of signal magnitude against frequency over a frequency range of interest of the audio signal A. A first point 501 is determined corresponding to the peak point of the spectral peak. In some embodiments the first point 501 may be defined by determining the resonance frequency $f_H$ as described above and then determining the actual signal magnitude at this frequency $f_H$. In some embodiments, however, the first point 501 may be defined by looking for the frequency with the highest signal magnitude $A_{max}$ in the relevant frequency range. In which case, in some embodiments, the frequency that corresponds to the highest signal magnitude may be identified as the resonance frequency $f_H$ without applying the integration method described above.

In any event, the frequency $f_1$ of this first point is determined. A second point 502 is defined by stepping up in frequency from $f_1$ by a defined amount $\Delta f$ and a third point 503 is defined by stepping down in frequency from $f_1$ by the defined amount $\Delta f$ and in each case determining the relevant signal magnitude for those frequencies. Conveniently, the same frequency interval $\Delta f$ is used to define the second and third points but this does not have to be the case and any other frequency interval could be applied and taken into account when applying the subsequent curve fitting.

A parabolic curve 504 is then be defined which passes through all three points using any suitable known curve fitting process.

The quality factor of the spectral peak, $Q_H$, may be estimated as the width of the parabolic curve at a predetermined magnitude interval kdB below the maximum magnitude $A_{max}$. In some embodiments, the predetermined magnitude interval kdB may be of the order of 3 dB.

Additionally or alternatively the parameters of the fitted curve, such as the peak point and the points at a predetermined magnitude interval kdB below the maximum magnitude $A_{max}$ may be normalised and used as the spectral parameters of the resonance.

These parameters, whether determined by the processing module 403 and supplied as the first signal A*, or determined by the comparison block 301, may then be compared to the relevant microphone parameters. In some instances the comparison block may simply compare the value of each parameter to a corresponding one of the predetermined characteristic microphone parameters. The comparison may determine if the determined spectral parameter from the first signal is a match for relevant characteristic parameter, i.e. whether the parameters value are the same, within a certain defined tolerance, or whether the determined spectral parameter is within an acceptable range of values for the predetermined microphone parameter. The comparison module 301 may output an indication of whether the spectral parameters are a sufficient match for the relevant predetermined microphone parameter. In some instances however the comparison block 301 may determine a score based on how similar the determined parameters are to the predetermined microphone parameter, for instance the comparison block could comprise a vector comparator for determining a distance measure between a vector based on the determined parameters and a vector based on the determined microphone parameters. Based on the comparison the determination block may provide the microphone verification signal $S_{MIC}$ as discussed in relation to FIG. 3. For instance the determination block may provide a positive verification if the comparison indicates that all determined parameters are a sufficient match for the predetermined microphone parameters and/or if a determined score or distance measure is within an acceptable range and otherwise may provide a negative verification.

Referring back to FIG. 4 the microphone verification signal $S_{MIC}$ may be provided to the voice authentication module 111 which is also arranged to receive a version of the digital audio signal. The microphone verification signal $S_{MIC}$ indicates whether or not the digital audio signal is verified as having originated from a microphone, and may indicate whether the audio signal is verified as having originated from a specific microphone. This can alert the voice authentication module 111 to the possibility of an attack such as a malware attack. The voice authentication module 111 may be configured so as not to process the digital audio signal if the microphone verification signal indicates that the audio signal A did not originate from a microphone as expected or to indicate a negative result for voice authentication.

In some embodiments, the microphone authentication apparatus 300 may only send a microphone verification signal $S_{MIC}$ to the voice authentication module 111 when the microphone authentication apparatus 300 cannot verify the audio signal, i.e. when the first signal A* is determined not to match the expected resonance.

In embodiments where the microphone authentication apparatus 300 is part of a trusted domain with the voice authentication module 111, i.e. as part of the same secure integrated circuit, the digital version of the audio signal A may be supplied directly to the voice authentication module 111 and microphone verification signal $S_{MIC}$ may also be sent directly to the voice authentication module 111. As noted above however in some embodiments the microphone authentication apparatus 300 may be located remotely from the voice authentication module 111 and connected via potentially unsecure communication pathways. For instance the microphone authentication module may be disposed on the codec/DSP 107 and may communicate with the voice authentication module 111 via pathways that may include or be controlled by the AP 108.

In which case the microphone authentication apparatus 300 could comprise a certification module 404 to apply an authentication certificate to at least one of the digital audio signal and/or the microphone verification signal $S_{MIC}$. For instance the certification module 404 could digitally sign the microphone verification signal $S_{MIC}$ in such a way that the voice authentication module 111 can verify that the microphone verification signal $S_{MIC}$ was validly sent from the microphone authentication apparatus 300 and has not been tampered with. Likewise some identifying characteristic of the digital audio signal, such as a hash value of the digital data could be determined and digitally signed by the certification module 404 so that the voice authentication module 111 can verify that the digital audio signal received is valid and has not been tampered with and corresponds to the digital audio signal verified by the microphone authentication apparatus 300.

As noted above the audio signal A received may, in some instance, be an analogue audio signal and may be converted into a digital signal with a sufficient sample rate to preserve the information in the signal band of interest. Alternatively the audio signal could be a digital signal, e.g. from a digital microphone, where the sample, rate is sufficiently high.

In some instances however the audio signal could be a digital signal which is output from a digital microphone at a relatively low sample rate, but where high frequency information is preserved.

Figure 6A:
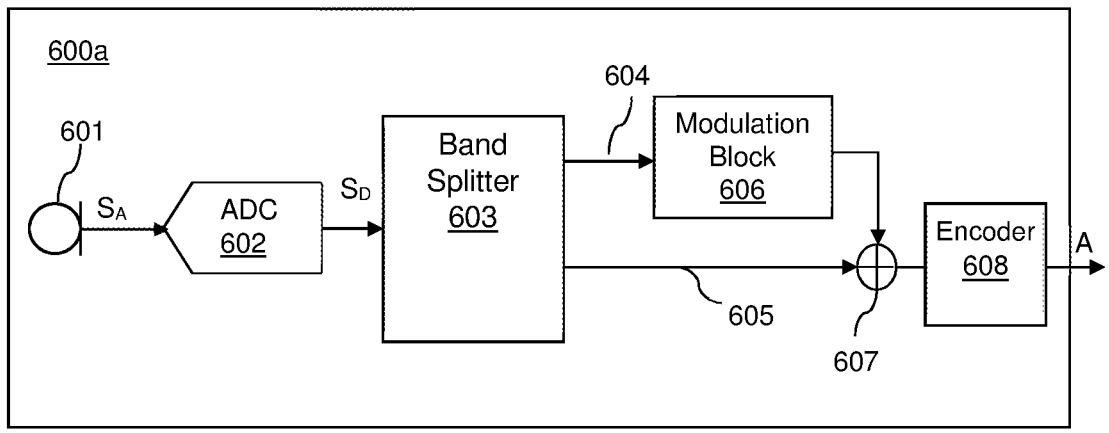
FIGS. 6a and 6b illustrate examples of digital microphones.

FIG. 6a illustrates examples of digital microphone 600a and 600b respectively suitable for generating an output digital signal which can be transmitted at a sample rate lower than would be needed for the high frequency information, but which preserves the high frequency information.

FIG. 6a illustrates a microphone transducer 601 that generates an analogue microphone signal $S_A$ which is input into an ADC 602. The ADC 602 operates at a sample rate which is sufficient high for the high frequency information of interest, i.e. to preserve information in the digital output signal $S_D$ from the ADC 602 from the frequency band in which a Helmholtz resonance may be expected. A frequency band of 20 kHz or so may be of interest for the detection of ultrasonic signals, e.g. for machine-to-machine communication and thus digital microphones with ADCs 602 that operate at such sample rates are known. However to avoid the output signal A from the digital microphone 600 having to be at such a high sample rate, the digital microphone includes a band splitter 603 is configured to split the digital signal $S_D$ into a first signal path 604 for frequencies in a first frequency band and a second signal path 605 for frequencies in a second frequency band, the frequencies of the first frequency band being higher than the frequencies in the second frequency band, and a modulation block 606 for down-converting signals in the first signal path to a lower frequency band.

The first frequency band may be a frequency band in which the resonance frequency associated with the acoustic port of the microphone 600 is expected to occur. The second frequency band may be a frequency band suitable for voice audio. In the example of FIG. 6a the first and second frequency bands may be non-overlapping frequency bands with a significant frequency difference between the highest frequency of the second frequency band and the lowest frequency of the first frequency band.

The modulation block 606 down-converts the signal in the first signal path from the first frequency band to a third frequency band, a down-converted frequency band which is lower than the first frequency band. In this example, the modulation block is arranged to down-convert the signals in the first signal path 604 to a third frequency band which does not overlap in frequency with the second frequency band. The third frequency band thus extends over at least part of the frequency range separating the first and second frequency bands. In some instances the third frequency band may be adjacent to the second frequency band, i.e. the high frequency limit for the second frequency band may be substantially the same as the low frequency limit for the third frequency band. In such an example the down-converted signals in the second signal path may be combined with the signals in the first signal path without any interference and the combined signal input to an encoder 608.

The encoder 608 encodes the combined signal as a digital audio signal A to be output. However as any high frequency signals in the first signal path have been down-converted to lower frequency signals, the sample rate required for the output digital signal is reduced compared to what otherwise would be needed.

In this example, the high frequency components of the original analogue microphone signal $S_A$ have been shifted in frequency in the output digital signal A. In this case the signal component arising from resonance associated with the acoustic port of the microphone will thus be frequency shifted in the output digital signal A. As such the position of the resonance peak would not correspond to the expected Helmholtz frequency $f_H$ for the microphone. The microphone authentication apparatus 300 may thus be adapted to take such a frequency shift into account.

Referring back to FIG. 4, if the input audio signal A received at node 401 were a digital signal as output from microphone 600a, the digital signal could be supplied directly to the comparison block 301 as the first signal A* for comparison with specific microphone data for the microphone 600a, but in that case the microphone data may correspond to the expected characteristics of a resonance at a frequency within the first frequency band taking into account the down-conversion to the third frequency band. In other words the predetermined characteristic microphone parameters would characterise a signal component in the third frequency band that corresponds to the profile of a Helmholtz resonance of the microphone after down-conversion. As noted above such microphone parameters could be determined from the signal output from the microphone during a test or calibration process.

Alternatively the processing module 403 could be arranged to at least partly compensate for the effect of the down-conversion within the digital microphone 600a. For instance the processing module could apply band-splitting to separate out the third frequency band and then up-convert, or the processing module could identify the parameters of any resonance components in the third frequency band and then apply appropriate scaling to the determined parameters.

Figure 6B:
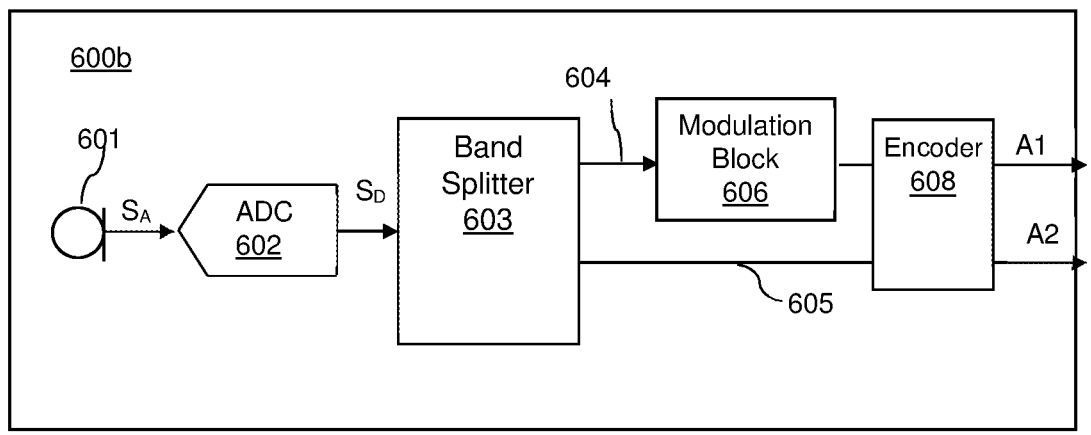

FIG. 6b illustrates another example of a digital microphone 600b in which similar components to those discussed with reference to FIG. 6a are identified by the same reference numerals. Again the analogue microphone signal $S_A$ from a microphone transducer 601 is converted to digital by an ADC 602 at a sample rate sufficient to preserve the high frequency information in a band of interest for a Helmholtz resonance.

Band-splitter 603 again splits the signal into first and second signal paths 604 and 605 for first and second frequency bands respectively. The first frequency band may extend to higher frequencies than the second frequency band and the first frequency band may cover the frequency range of interest for a Helmholtz resonance and the second frequency band may cover a frequency range of interest for voice audio. The signals in the first signal path may be down-converted to a lower frequency band, i.e. a third frequency band, in order to reduce the same rate requirement for output from the digital microphone 600b in a similar fashion as discussed above. In this instance however the first and second signal paths are input separately to encoder 608 which transmits the two signals as separate logical channels, e.g. as two different channels of a suitable data transport protocol. Thus for instance a digital first audio signal A1 encoding the down-converted signals from the first signal path may be transmitted, e.g. over a side channel, compared to a second digital audio signal A2 encoding the signals in the second data path. In this instance, as the first and second audio signals A1 and A2 are effectively transmitted independently the third frequency band, to which signals in the first signal path are down-converted, could at least partly overlap with the second frequency band Likewise the first and second frequency bands could partly overlap.

Figure 7:
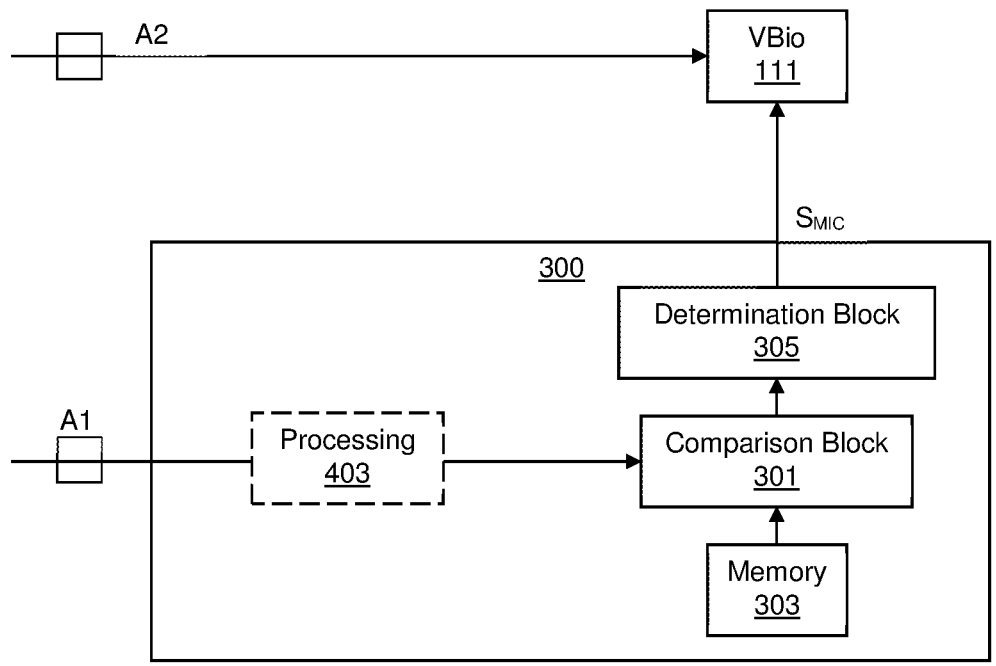
FIG. 7 illustrates another example of an authentication system having a microphone authentication apparatus.

In this example the output signal A1 contains the information relevant for determining whether there is an appropriate acoustic resonance whereas the output signal A2 comprises the voice audio information that would be useful for voice biometric authentication. Thus as illustrated in FIG. 7 in such a case the audio signal A1 may be provided to the microphone authentication apparatus 300 whilst the voice audio signal A2 is provided directly to the voice authentication module. The microphone authentication apparatus would thus verify whether the audio signal A1 had originated at the microphone 600b, possibly processing the signal to compensate for the down-shifting as discussed above. Verification that the audio signal A1 did originate at the microphone may be taken as verification that the audio signal A2 also originated at the microphone.

As noted above however in some embodiments a digital microphone, as opposed to an analogue microphone, may be arranged to provide a digital audio signal at a sufficiently high sample rate to correctly represent the signal components of interest for any acoustic resonance associated with the microphone. Such a high sample rate digital signal may, in some instances, be provided directly to the voice biometric authentication module 111 which may include a microphone authentication apparatus 300 as described above. In some instances though the digital audio signal may be initially received by some other component, say the codec 107, before being forwarded to the voice biometric authentication module 111 with a microphone authentication apparatus. In order to preserve the relevant signal components in the frequency band of the interest the codec 107 would have to output a sufficiently high sample rate signal to the voice biometric authentication module 111. The codec 107 could, in effect, operate in a high sample rate pass-through mode, although it may be preferable to digitally sign the audio data as discussed above to protect against tampering of the signal path between the codec 107 and voice biometric authentication module 111. This will require relatively high speed processing and transmission of relatively large amounts of audio data between the codec 107 and voice biometric authentication module 111.

Figure 8:
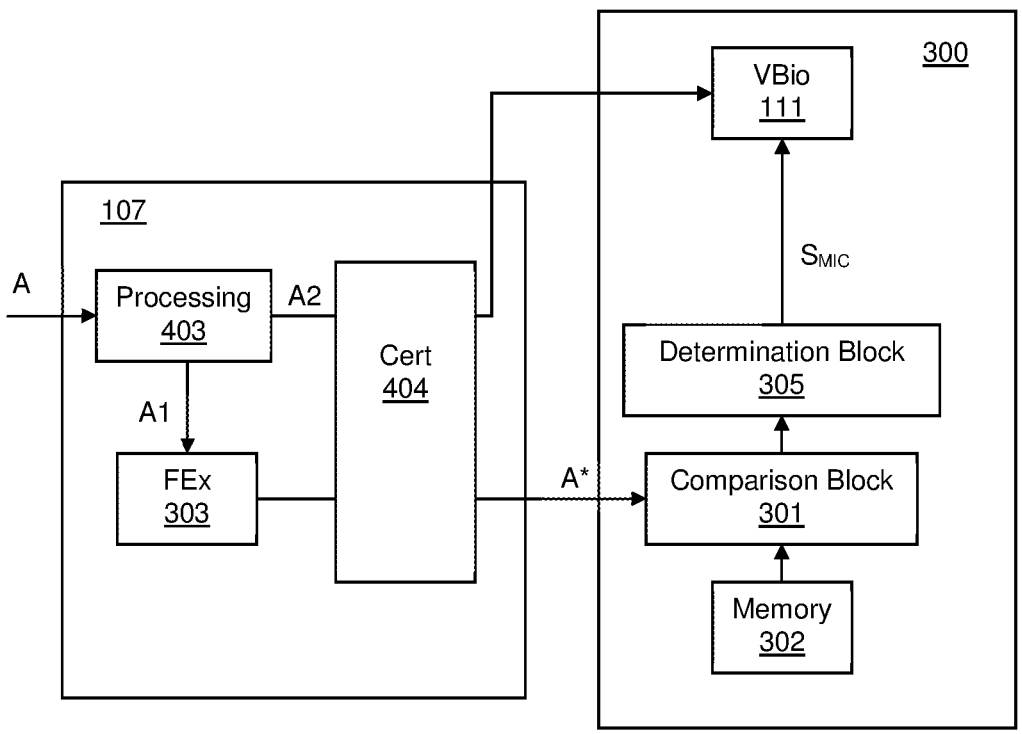
FIG. 8 illustrates an example where microphone authentication and extraction of spectral features are implemented on separate components.

In some embodiments therefore, as illustrated in FIG. 8, a high sample rate digital audio signal A may be received by a component such as a codec 107 and processed by a processing module 403 which may separate the audio signal into a first audio signal A1 comprising the frequency band of interest for the acoustic resonance associated with the microphone and a second audio signal A2 corresponding to the voice audio. The processing module 403 may reduce the sample rate of the second audio signal A2 to a sample rate suitable for voice audio. This reduced sample rate second audio signal A2 may, in some instances, be digitally signed by a certification module 404 and transmitted to the voice biometric authentication module 111. The first audio signal A1 is provided to a feature extract module 303 such as described above which determines the relevant spectral parameters corresponding to any acoustic resonance in the first audio signal. A signal A* corresponding to the determined parameters may then be signed by certification module 404 and output to a microphone authentication apparatus associated with the voice biometric authentication module 111 where it may be received and used as the first signal for the comparison block 301. The first signal A* may thus be a relatively low data rate signal that comprises a relatively small amount of data relating to the values of the determining spectral parameters. This avoid the needs for a high sample rate data channel between the codec 107 and voice biometric authentication module 111.

Figure 9:
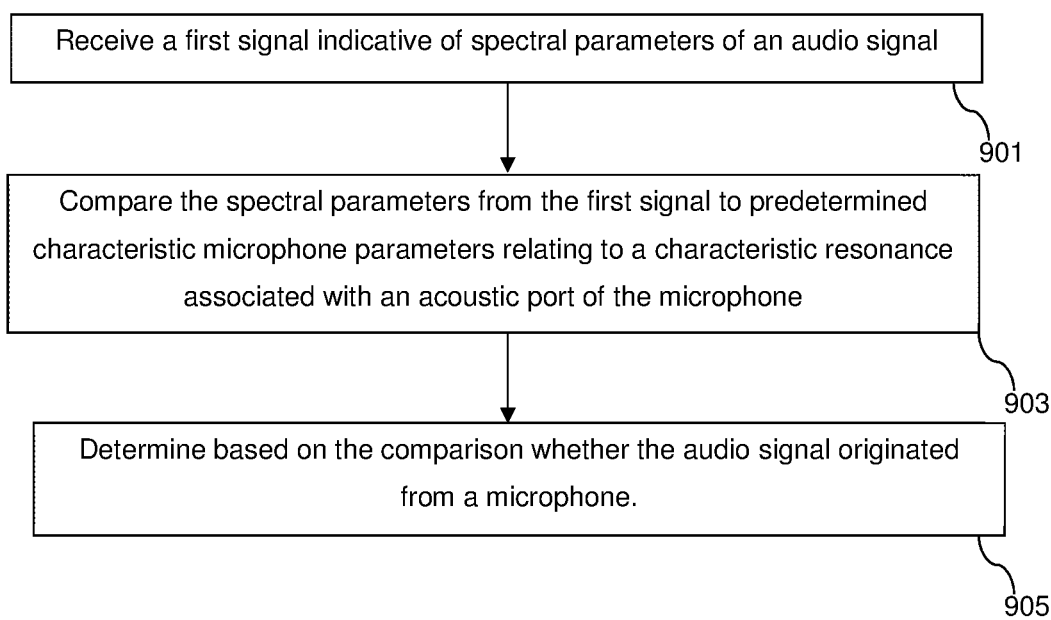
FIG. 9 illustrates a method of authenticating whether an audio signal originated at a microphone.

FIG. 9 illustrates a method of verifying whether an audio signal A did originate at a microphone. The method comprises in step 901 receiving a first signal A* indicative of one or more spectral parameters of the audio signal A. In some embodiments, the first signal A* may be at least part of the audio signal. In some embodiments, however the first signal A* may be derived from the audio signal A and may correspond to determined parameter values.

In step 903 the method comprises comparing the spectral parameters from first signal A* to predetermined characteristic microphone parameters relating to a characteristic resonance associated with an acoustic port of the microphone. As described previously the microphone data may parameters characterising a resonance peak expected from such a characteristic resonance, e.g. the peak resonance frequency $f_H$ and/or a quality factor of a spectral peak associated with the characteristic resonance frequency.

In step 905 the method comprises determining based on the comparison whether the first signal A* is representative of the characteristic frequency and thus whether audio signal did originate at the microphone.

The embodiments discussed above involve analysing a first signal, indicative of an audio signal which may have originated from a microphone, to verify whether or not the audio signal did indeed originate from the microphone. Embodiments compare the first signal, or at least parameters defined by or extracted from the first signal, to known microphone characteristics indicative of expected acoustic properties of a signal that did originate from the microphone. In particular the acoustic properties may be characteristics of an expected acoustic resonance associated with the acoustic system of the microphone. Additionally or alternatively however the comparison block could determine whether the microphone signal exhibits other acoustic properties that are in line with expected signal from the microphone, i.e. at least one distinguishing acoustic characteristic associated with the microphone. The at least one distinguishing acoustic characteristic may comprise a characteristic resonance as described above, or may comprise some other acoustic characteristic such as an inability to register signals below a certain frequency, or some other acoustic feature associated with the structure of the microphone itself.

There is therefore provided apparatus and methods for authentication of microphone signals. In particular the disclosed embodiments may use distinguishing acoustic characteristics of audio signals which are generated by microphones, and in particular to an inherent acoustic resonance of an acoustic system associated with the microphone, in order to authenticate that a received signal was originally generated by a microphone.

As noted previously verifying that an audio signal does have a signal component that corresponds to an expected acoustic resonance associated with a particular microphone can add to the security of a voice biometric system as it may allow the identification of audio signals which lack any such resonance or do not have the correct resonance as possible attacks. It will be appreciated of course that in theory false audio could be generated as actual sounds to be detected by the relevant microphone. For instance malware could attempt to play synthesised audio via a loudspeaker of the device to be received via the correct microphone of the device. However a user may notice if their device makes unexpected noises. Also such an attack is not scalable as the audio playback and detection would have to happen at normal speaking rate, which limits the number of attacks that can realistically be made in a given time frame.

The methods and apparatus may be implemented in a device such as illustrated in FIG. 1. The system of FIG. 1 comprises processing circuitry, which may comprise one or more processors, such as a central processing unit or an applications processor (AP) 108, or a digital signal processor (DSP) 107, or voice authentication processor 111. The one or more processors may perform methods as described herein on the basis of data and program instructions stored in memory 109. Memory 109 may be provided as a single component or as multiple components or co-integrated with at least some of processing circuitry 107, 108 or 111. Specifically, the methods described herein can be performed in processing circuitry 107, 108 and/or 111 by executing instructions that are stored in non-transient form in the memory 109, with the program instructions being stored either during manufacture of the system or device 100 or by upload while the system or device is in use.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

At least some embodiments may be implemented in a host device, especially a portable and/or battery powered host device. Some embodiments may be implemented in an electronic device which may comprise at least one of: a communication device, a mobile or cellular telephone, a smartphone; a computing device; a laptop, notebook or tablet computing device; a media player; a games device; a wearable device; a smartwatch; a voice controlled device. In some instances, authentication apparatus may be embodied in an accessory device for use with any of the above mentioned devices, for instance headsets, headphones, earbuds, speakerphones etc. that may communicate with an electronic device, whether via a wired or wireless connection. Embodiments also relate to a system comprising an electronic device and an accessory. In some embodiments verification apparatus may be implemented in a server or similar.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A microphone authentication apparatus comprising: a comparison block configured to:
    receive a first signal indicative of one or more spectral parameters of at least part of an audio signal to be verified, and
    compare said one or more spectral parameters of the first signal to one or more predetermined characteristic microphone parameters relating to a characteristic resonance associated with an acoustic port of a microphone; and
    a determination block configured to determine based on the comparison whether the audio signal originated from a microphone;
    wherein the first signal comprises at least part of the audio signal to be verified and the microphone authentication apparatus comprises a feature extract module configured to determine at least one spectral parameter of any resonance component within a signal band of interest of the first signal; and
    wherein the feature extract module is configured to:
    identify any resonance component within the signal band of interest of the first signal;
    apply curve fitting to any such identified resonance component to determine a fitted curve function; and
    determine at least one spectral parameter from the fitted curve function;
    wherein the comparison block, the determination block, and the feature extract module are implemented by hardware components and one or more software processors.

2. A microphone authentication apparatus as claimed in claim 1 wherein the one or more predetermined characteristic microphone parameters comprises a peak frequency or range of peak frequencies of the characteristic resonance.

3. A microphone authentication apparatus as claimed in claim 1 wherein the one or more predetermined character-istic microphone parameters comprises a quality factor or a range of values of quality factor for the characteristic resonance.

4. A microphone authentication apparatus as claimed in claim 1 wherein the one or more predetermined characteristic microphone parameters are at least one of:
    parameters of, or derived from, a model of the characteristic resonance;
    parameters of a function describing the characteristic resonance;
    parameters of a parabolic curve describing the characteristic resonance.

5. A microphone authentication apparatus as claimed in claim 1 wherein the one or more predetermined characteristic microphone parameters comprises at least one set of generic microphone parameters for one or more generic microphones and wherein the determination block is configured to determine whether the audio signal originated from any microphone based on a comparison of the first signal with said at least one set of generic microphone parameters.

6. A microphone authentication apparatus as claimed in claim 1 wherein the one or more predetermined characteristic microphone parameters comprises at least one set of specific microphone parameters relating to a specific microphone and wherein the determination block is configured to determine whether the audio signal originated from the specific microphone based on a comparison of the first signal with respective one set of specific microphone parameters.

7. A microphone authentication apparatus as claimed in claim 6 wherein the comparison block is further configured to compare said one or more spectral parameters of the first signal to a set of one or more second predetermined characteristic microphone parameters relating to a second characteristic resonance associated with a membrane of the specific microphone, and wherein the determination block is further configured to determine whether the audio signal originated from the specific microphone based on a comparison of the first signal with said set of second predetermined characteristic microphone parameters.

8. A microphone authentication apparatus as claimed in claim 1 further comprising an analogue to digital converter configured to receive the audio signal to be verified and output a digital version of the audio signal.

9. A microphone authentication apparatus as claimed in claim 1 wherein the microphone authentication apparatus is configured to receive the audio signal to be verified as a digital audio signal from a digital microphone.

10. A microphone authentication apparatus as claimed in claim 9 wherein said digital audio signal comprises a first signal part that corresponds to signal components that have been down-converted from a first frequency band to a down-converted frequency band, wherein the first frequency band comprises a frequency band of interest for the characteristic resonance.

11. A voice authentication apparatus comprising:
    a microphone authentication apparatus as claimed in claim 1; and
    a voice authentication module configured to receive the audio signal and determine whether the audio signal corresponds to the voice of a registered user.

12. A microphone authentication apparatus as claimed in claim 1 wherein the comparison block is further configured to compare said one or more spectral parameters of the first signal to one or more second predetermined characteristic microphone parameters relating to a second characteristic resonance associated with a structure of the microphone.

13. A microphone authentication apparatus as claimed in claim 12 wherein the second characteristic resonance is a resonance associated with a membrane of the microphone.

14. A microphone authentication apparatus comprising:
a comparison block configured to:
receive a first signal indicative of one or more spectral parameters of at least part of an audio signal to be verified, and
compare said one or more spectral parameters of the first signal to one or more predetermined characteristic microphone parameters relating to a characteristic resonance associated with an acoustic port of a microphone; and
a determination block configured to determine based on the comparison whether the audio signal originated from a microphone, wherein the determination block is configured to output a microphone verification signal indicating whether or not the audio signal is determined to have originated from the microphone wherein the determination block is configured to output the microphone verification signal to a voice authentication module; and
a certification module for signing the microphone verification signal such that it can be verified that the microphone verification signal is genuine;
wherein the comparison block, the determination block, the voice authentication module, and the certification module are implemented by hardware components and one or more software processors.

15. A microphone authentication apparatus as claimed in claim 14 wherein the one or more spectral parameters are parameters defining said fitted curve.

16. A microphone authentication apparatus as claimed in claim 14 wherein said at least one spectral parameter comprises a resonance peak frequency.

17. A microphone authentication apparatus as claimed in claim 14 wherein said at least one spectral parameter comprises a resonance peak quality factor.

18. A microphone authentication apparatus as claimed in claim 14 comprising a processing module configured to receive a version of the audio signal to be verified and to process the audio signal to provide the first signal.

19. A microphone authentication apparatus comprising:
a comparison block configured to:
receive a first signal indicative of at least part of an audio signal to be verified, and compare the first signal to microphone data relating to a characteristic resonance associated with an acoustic port of a microphone;
a determination block configured to determine based on the comparison whether the audio signal originated from a microphone, wherein the determination block is configured to output a microphone verification signal indicating whether or not the audio signal is determined to have originated from the microphone wherein the determination block is configured to output the microphone verification signal to a voice authentication module; and
a certification module for signing the microphone verification signal such that it can be verified that the microphone verification signal is genuine;
wherein the comparison block, the determination block, the voice authentication module, and the certification module are implemented by hardware components and one or more software processors.

20. A microphone authentication apparatus comprising: a comparison block configured to:
receive a first signal indicative of at least part of an audio signal to be verified, and compare the first signal to microphone data relating to a first characteristic resonance associated with an acoustic port of a known microphone and a second characteristic resonance associated with a structure of the known microphone itself;
a determination block configured to determine based on the comparison whether the audio signal originated from the known microphone, wherein the determination block is configured to output a microphone verification signal indicating whether or not the audio signal is determined to have originated from the microphone wherein the determination block is configured to output the microphone verification signal to a voice authentication module; and
a certification module for signing the microphone verification signal such that it can be verified that the microphone verification signal is genuine;
wherein the comparison block, the determination block, the voice authentication module, and the certification module are implemented by hardware components and one or more software processors.

* * * * *